United States Patent Office 2,994,725
Patented Aug. 1, 1961

2,994,725
ORGANIC CHEMICAL REACTIONS
Alfred W. Shaw, Oakland, and George Holzman, Walnut Creek, Calif., assignors to Shell Oil Company, New York, N.Y., a corporation of Delaware
No Drawing. Filed June 30, 1958, Ser. No. 745,332
11 Claims. (Cl. 260—668)

This invention relates to an improvement in chemical reactions in which metalated compounds act as reaction intermediates. More specifically, it relates to the use of improved alkali metal catalysts in such reactions.

It is known that it is a peculiar characteristic of the alkali metals that they can form addition compounds with organic compounds containing carbon-carbon, carbon-nitrogen, or carbon-oxygen double bonds. A number of such metalated compounds have been isolated. Organic alkali metal addition compounds are particularly useful as reaction intermediates. A number of chemical reactions are known in which a compound capable of forming a metalated product by reaction with an alkali metal is condensed with another compound in a reaction in which an alkali metal acts as catalyst for the condensation. It is generally believed that the mechanism of these reactions involves the formation of the metalated intermediate of the first-mentioned compound, followed by reaction thereof with the second-mentioned compound. The metalated compounds need not be preformed or isolated in these reactions.

A reaction which is typical of the alkali metal-catalyzed reactions referred to is the alkylation of alkyl side chains of aromatic hydrocarbons by means of nonconjugated olefins. This reaction was first described in U.S. Patent 2,448,641 to Whitman. Whitman's reaction required temperatures of 150° to 450° C., pressures of 50 to 3,000 atmospheres and reaction times of 10 to 17 hours. It was thereafter found by Little, U.S. 2,548,803, that the same reaction could be carried out at pressures of 100 to 3,000 atmospheres but at lower temperatures of 0° to 130° C. when using as catalyst a preformed organo-alkali metal compound such as an alkali metal alkyl or an alkali metal aryl. These reactions required 16 hours contact time.

Similar organo-alkali metal compound catalysts were employed by Closson et al. in U.S. 2,728,802. A variety of organic reaction promotors for the alkali metal-catalyzed alkylation of side chains of aromatic compounds were disclosed by Pines et al. in U.S. Patents 2,670,390, 2,688,044, 2,721,885, 2,721,886 and 2,748,178.

Other typical alkali metal-catalyzed reactions are known. The alkylation of side chains of heterocyclic compounds having a nitrogen atom in a six-membered ring is shown in U.S. 2,750,384 to Closson et al. The intercondensation of olefins is shown in U.S. 2,466,694 to Freed. The alkylation of isoparaffins is disclosed in U.S. 2,834,818 to Schmerling et al.

All of these reactions are characterized in that two molecules interact, in the presence of the catalyst, to form a new compound. One of the reactant molecules must contain a double bond. The other molecule must have a relatively active hydrogen atom. It is preferable that the activity of this hydrogen be at least about equivalent to that of a hydrogen attached to a carbon which is alpha to a ring carbon atom in an aromatic ring. However, under some conditions hydrogens as weak as the tertiary hydrogens of isoparaffins may react. The activity of hydrogen atoms may be expressed on the well-known pK scale.

On this scale, the pK of the methyl group hydrogens of toluene is about 37, that of the allylic hydrogens of propylene is estimated to be about 36.5. The hydrogens in ammonia and the bridge hydrogens in diphenylmethane are 35. Compounds having hydrogens whose pK is 37 or lower react most readily in these processes. Those whose pK is between 37 and 40 or higher may also react at suitably severe conditions.

The molecule having an active hydrogen atom is believed to interact with the alkali metal present to form a metalated intermediate which reacts with the molecule containing an olefinic double bond. This metalated intermediate may be relatively stable or very unstable. It is generally not isolated in the condensation reactions of this invention.

At suitably selected conditions the hydrogen atoms of an olefin are sufficiently active that the two interacting molecules can actually be molecules of a single olefinic compound.

It is an object of this invention to provide improved alkali metal-containing catalysts for use in chemical reactions in which metalated compounds act as reaction intermediates. Another object is to provide an improvement in the alkali metal-catalyzed condensation of compounds containing an active hydrogen atom with organic compounds containing an unsaturated linkage. It is a further object to provide improved alkali metal catalysts which are more reactive than any catalyst hitherto used in such reactions.

It is a specific object to provide improvements in processes for the alkaylation of a saturated carbon atom attached to a nuclear carbon atom of an aromatic or heterocyclic or alicyclic ring which latter carbon atom is in turn attached by a double bond to another ring carbon atom.

It is a further object to provide a novel process for the dimerization of propylene. It is a specific object to provide a process for the production of 4-methyl-1-pentene.

Another object is to provide an improved process for the copolymerization of olefins to produce a large proportion of alpha-olefins.

It has now been found that organic reactions in which an alkali metal acts as catalyst by forming an intermediate with a compound having an active hydrogen atom are promoted more effectively by a combination of an alkali metal and finely-divided iron. The general effect of iron powder as promoter is to increase the reaction rate. It permits reactions to take place at conditions at which no reaction would take place with an unpromoted alkali metal.

Although no explanation can be offered at this time, it has also been found that iron powder not only promotes known reactions but can result in a profoundly different product distribution, compared to the use of other promoters. For example, the dimerization of propylene with a conventional catalyst results in a product whose $C_6$ fraction consists largely of internal olefins and very little 4-methyl-1-pentene. On the other hand, the catalyst of this invention results in a product whose $C_6$ fraction consists mainly of 4-methyl-1-pentene. The latter product is a highly desirable monomer for the production of isotactic polymers and is not readily produced by known methods. The hexenes produced by the use of the conventional catalyst are not attractive for the same purpose. It is interesting to note that the equilibrium mixture of hexene isomers at the temepratures employed contains less than one percent of 4-methyl-1-pentene.

The alkali metals, lithium, sodium, potassium, rubidium, and cesium are not equally active as catalyst. As a rule, their activity increases with increasing molecular weight. Combining the alkali metal or mixtures thereof with finely-divided iron powder produces in each case a catalyst that is substantially more active than the unpromoted metal in that the rate of reaction is greatly increased over that achieved with the alkali metal or mixture alone.

The iron used in combination with an alkali metal is preferably in the form of iron powder, having particle sizes in the range from about 20 mesh to 325 mesh. Somewhat larger or smaller particles may be employed, but coarse iron particles, such as iron turnings, are substantially ineffective as promoter. The amount of iron is suitably in the range from 0.01 to about 190% be weight based on the alkali metal. The alkali metal is generally a liquid at reaction conditions. In a preferred form, the iron powder and alkali metal are simply mixed and used as a slurry at the reaction conditions. In another mode of use, iron powder is composited with or deposited on an inert supporting material in the form of pellets or similar particles and alkali metal is added to the composite. The alkali metal may cling to the composite as a film. Such a composite is suitable for use in fixed-bed reactors.

The surface area of the iron is desirably of the order of 0.5 m.$^2$/gm. or greater.

In one aspect, the present invention relates to a method for forming a metalated organic compound by reacting a compound which contains an active hydrogen atom in the presence of an alkali metal promoted by the addition of finely-divided iron.

In a preferred embodiment, the present invention relates to a method for condensing a compound containing an active hydrogen atom with an organic compound containing an unsaturated linkage by reacting a mixture of said compounds with an alkali metal promoted by the addition of finely-divided iron.

The compounds of the first class, characterized by an active hydrogen atom, which form metalated reaction intermediates and with which unsaturated organic compounds can be condensed according to the process of this invention, are selected from the following five groups:

(1) The first group consists of cyclic compounds having attached to a nuclear carbon atom, which is attached by a double bond to another nuclear carbon atom, a carbon atom of a hydrocarbyl group to which carbon atom is attached at least one hydrogen atom.

This group of compounds includes carbocyclic aromatic and hydroaromatic compounds and heterocyclic compounds. The carbocyclic compounds may have a benzene, naphthalene, etc. nucleus. The heterocyclic compounds may have a pyridine, furan, thiophene, pyrrole, pyrazole, etc. nucleus. The compounds may contain both a carbocyclic ring and a heterocyclic ring such as is found in indole and in carbazole. The compounds may also contain both a benzene nucleus and a cycloalkane nucleus such as is found in tetralin and in indan. The hydroaromatic compounds preferably contain no geminally-substituted carbon atoms. The cyclic compounds preferred for use contain a saturated side chain attached to a nuclear carbon atom by a saturated carbon atom, that is, a carbon atom that is bonded by univalent bonds to four other atoms. The saturated carbon atom should have at least one hydrogen atom attached to it. The side chain may comprise only one carbon atom, as the methyl group in toluene, or it may comprise a number of saturated carbon atoms in straight-chain or branched-chain relation, such as the normal butyl radical or the isobutyl radical in normal butylbenzene and in isobutylbenzene, respectively. The substituent need not necessarily be an aliphatic chain; it may be a cycloalkane radical as in tetralin or as in cyclohexylbenzene or an aralkyl group, as a benzyl group, as in diphenylmethane.

Suitable cyclic compounds include toluene, ethylbenzene, n-propylbenzene, isopropylbenzene, n-butylbenzene, isobutylbenzene, sec. butylbenzene, m-xylene, o-xylene, p-xylene, mesitylene, methyl naphthalene, tetralin, indan, diphenylmethane, cyclopentylbenzene, cyclohexylbenzene, methylcyclohexylbenzene, methylethylbenzene, 1-methyl-1-cyclohexene, 1-ethyl-1-cyclohexene, 1-propyl-1-cyclohexene, 1,2-dimethyl-1-cyclohexene, 1,4-dimethyl-1-cyclohexene, 1,3,5-trimethyl-1-cyclohexene, etc. The ring in the compounds herein referred to may contain other substituents, such as a chloro group, a methoxy group, an ethoxy group, a nitro group, and the like.

(2) Although the alkali metal catalysts used previously do not generally permit appreciable reaction of unsubstituted cyclic compounds, the more active catalysts of this invention permit the direct nuclear alkylation of certain unsubstituted cyclic compounds. The second group of suitable compounds containing active hydrogen according to this invention consists of unsubstituted monocyclic or polycyclic, carbocyclic and heterocyclic compounds of aromatic nature. Included in this group are aromatic hydrocarbons such as benzene, naphthalene, anthracene and the like, and heterocyclics such as pyridine, furan, thiophene, etc.

(3) The third group consists of compounds having an olefinic double bond, including acyclic and cyclic olefins.

This group includes ethylene, propylene, 1-butene, 2-butene, isobutylene, 1-pentene, 2-pentene, 1-hexene, 2-hexene, 3-hexene, 1-heptene, 2-heptene, 3-heptene, the four normal octenes, the four normal nonenes, etc., 3-methyl-1-butene, 2-methyl-2-butene, 3-methyl-1-pentene, 3-methyl-2-pentene, 4-methyl-1-pentene, 4-methyl-2-pentene, tetramethylethylene and the like. It also includes cycloolefins, such as cyclopentene, cyclohexene, methylcyclopentene, methylcyclohexene, and the like.

(4) The fourth group consists of ammonia and primary and secondary aliphatic amines. The unsaturated compound is added to the amine nitrogen.

Suitable amines include, for example, methylamine, dimethylamine, ethylamine, diethylamine, methylethylamine, n-propylamine, isopropylamine, dipropylamine, diisopropylamine, and numerous other mono- and diamines, e.g., octylamine, didecylamine, tetradecylamine and dioctadecylamine. These compounds can be classified as compounds of the formula $R_1R_2NH$, where $R_1$ and $R_2$ are selected from the group consisting of hydrogen and aliphatic radicals.

(5) The fifth group consists of phosphine and primary and secondary aliphatic phosphines. The unsaturated compound is added to the phosphorus atom.

Suitable phosphines include, for example, methylphosphine, dimethylphosphine, ethylphosphine, and other analogs of the amines mentioned above. These compounds can be classified as compounds of the formula $R_1R_2PH$, where $R_1$ and $R_2$ are selected from the group consisting of hydrogen and aliphatic radicals.

Reactants of the first class, selected from the above-named groups, can be condensed according to the process of this invention with compounds of the second class, namely unsaturated compounds from one of the following three groups:

(1) The first group consists of compounds having a nonconjugated, non-aromatic carbon-to-carbon double bond.

Suitable nonconjugated, olefinically-unsaturated organic compounds are monoolefins such as ethylene, propylene, 1-butene, 2-butene and isobutylene and other monoolefins of higher molecular weight; nonconjugated dienes such as 2,5-dimethyl-1,5-hexadiene and nonconjugated polyolefins containing more than two pairs of double bonds per molecule. Eethylene is particularly preferred in this group. Other preferred compounds in this group are monoolefins in which the alpha carbon atom adjacent the double bond is a quaternary carbon atom, that is, it contains no hydrogen atoms, such as in 3,3-dimethyl-1-butene. Cyclic olefins are also included, e.g., cyclopentene, cyclohexene, methylcyclopentene, methylcyclohexene, and the like.

(2) The second unsaturated group consists of compounds containing a nonconjugated carbon-oxygen double bond, in which the carbon which is bonded to oxygen does not also contain a hydrogen atom.

Suitable compounds of this type are ketones such as dimethylketone, methylethylketone and ketones of higher molecular weight including cyclic ketones such as cyclohexanone and camphor and diketones such as acetylacetone.

(3) The third unsaturated group consists of carbocyclic aromatics and heterocyclic compounds, including benzene, naphthalene, anthracene, pyridene, furan, thiophene, and the like, and their alkylsubstituted derivatives having at least one nuclear hydrogen. The metalated compound of the first class adds to the nucleus of these compounds.

Not all of the possible reactants of the two general classes are equally reactive. Less reactive reactants of one class may not react with less reactive ones of the other class. For example, ethylene is a particularly reactive unsaturated reactant and will react even with benzene when the preferred catalysts of this invention are employed, whereas higher olefins or cyclic compounds may result in little or no reaction with benzene. The order in which the groups in each class were listed above is arbitrary and of no chemical significance.

In general it will not be necessary to employ organic promoting compounds with the catalyst combinations of this invention. However, organic promoters known to be useful with the alkali metal catalysts of the prior art can also be employed with the present iron-promoted catalysts. The organic promoters are described in the above-named Pines et al. patents and include fused-ring polycyclic aromatic hydrocarbons, acetylenic hydrocarbons, heterocyclic compounds containing a ring consisting of nitrogen and four to five carbon atoms, alcohols, carboxylic acids, ethers, organic nitrates and cyanides, hydrocarbyl halides, and organic peroxy and azo compounds. When organic promoters are employed the reaction is preferably carried out at a lower temperature than in the absence of such promoters.

The condensation reactions are carried out using either batch or continuous types of operation in suitable equipment such as autoclaves or tubular reactors constructed from steel, or glass-lined steel reactors. The process is suitably carried out at a temperature of from about 100° to about 350° C., preferably from 125° to 250° C. and most preferably from 175° to 200° C.

The process pressure is at least about 5 atmospheres absolute, and preferably above about 12 atmospheres. Pressures of 100 atmospheres absolute and higher may be employed.

In the aforementioned condensation reactions it is generally preferred to employ at least a stoichiometric amount and still better an excess of the compound of the first class, i.e., those containing an active hydrogen atom, with respect to the unsaturated compound of the second class.

In carrying out a condensation reaction, the unsaturated compound such as ethylene may be introduced into contact with the compound containing an active hydrogen continuously or intermittently, the latter method being commonly employed in the usual type of batch operation conducted in an autoclave. If desired, a relatively inert solvent may be present. After the reaction has reached the desired stage of completion, the reaction products are discharged from the autoclave. Gaseous organic reagents are recovered for further use in the process or utilized for some other purpose. The mixture of reaction products is then subjected to suitable separation treatment such as filtration to remove unconsumed iron powder and alkali metal catalyst and/or metalated organic compounds. The normally liquid products are fractionated to separate unconverted charging stock from condensation products and higher-boiling material, the latter being sometimes formed as by-products of the reaction. It is often desirable to "kill" the catalyst and decompose any metalated organic compound present by adding a polar compound, such as an alcohol, to the reaction residue.

In a preferred mode of this invention, one molecular proportion of olefin such as ethylene, and one molecular proportion of alkyl aromatic hydrocarbon such as toluene, are reacted in the presence of iron powder and alkali metal to form a longer chain alkyl aromatic hydrocarbon as illustrated by the following over-all equation:

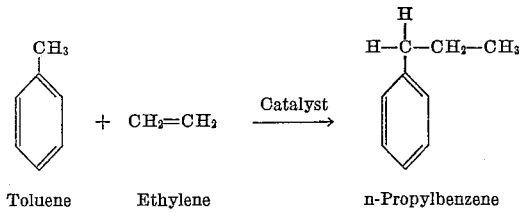

Toluene  Ethylene  n-Propylbenzene

The resultant reaction product such as n-propylbenzene may be reacted with a further molecular proportion of olefin such as ethylene to form a still longer chain alkyl aromatic hydrocarbon as indicated by the following over-all equation:

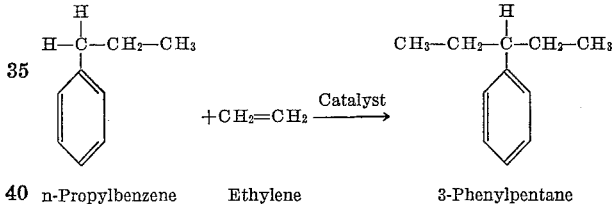

n-Propylbenzene  Ethylene  3-Phenylpentane

Other alkyl aromatic hydrocarbons and cycloalkyl aromatic hydrocarbons may be reacted similarly with ethylene to produce longer chain alkyl aromatic hydrocarbon from one molecular proportion of the charged alkyl aromatic hydrocarbon and one, two or more molecular proportions of the olefin.

In the above reaction, the alkyl aromatic reagent forms an unstable metalated compound by reaction with the catalyst. The reaction mechanism is considered to be as follows:

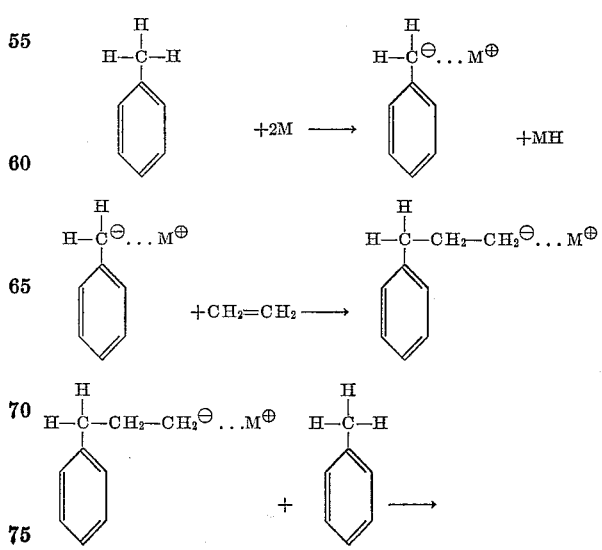

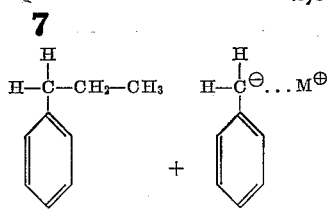

In the above series, M is an alkali metal atom. The above series of reactions does not take place directly, or only with extreme difficulty, with less active catalysts of the prior art, in the absence of promoters of the type which are readily metalated. With the active catalysts of this invention, the reactions proceed readily without extraneous promoters.

The nature of the invention is further illustrated by the following examples which, however, should not be construed to limit the scope of the invention.

EXAMPLE I

Run No. 1 was carried out as follows: A stainless steel autoclave equipped with a magnetic plunger and having 250 cc. capacity was charged with 92.0 grams of toluene and 4.0 grams of potassium. The autoclave was then closed and ethylene was introduced into the autoclave to an initial pressure of 30.5 atmospheres. This was the amount of ethylene calculated to be one mole per mole of toluene present. The magnetically operated plunger of the autoclave was then started and the autoclave put in a furnace and heated as rapidly as possibly to 200° C. The autoclave was equipped to permit continuous measuring of the pressure therein and a record of the pressure was made.

From the initial pressure of 30.5 atmospheres, the pressure rose as the autoclave was heated until, at a temperature of 200° C. and after an elapsed time of 30 minutes, the pressure was about 74 atmospheres. Heating was discontinued but the pressure continued to rise further and reached a peak of 86.5 atmospheres after an elapsed time of about 60 minutes. The pressure then began to drop, indicating completion of the reaction. The drop was rapid after 80 minutes had elapsed.

The autoclave was permitted to cool to room temperature. The gas was then vented to a gas collector for analysis and the liquid contents were recovered and separately analyzed. The solid material remaining in the bomb was treated with isopropyl alcohol and additional residual material recovered in isopropyl alcohol solution. This material was also analyzed. The reaction conditions and recovered products are shown in Table 1.

In this and numerous similar experiments it was found that the condensation reaction generally commenced at a temperature of 200° C. or somewhat below 200° C. and resulted in a temperature rise in the autoclave. In each case the heating was discontinued after reaction had commenced and the degree to which the reaction proceeded was then found by observing the pressure in the autoclave as well as by subsequent analysis of the products.

For convenience of comparison the reaction time is considered to be that period of time between the moment at which the autoclave reaches a temperature of 200° C. and that at which the pressure in the autoclave drops to 20 atmospheres.

Run No. 2 was carried out in essentially the same manner as run No. 1, but with the addition of about 7 parts by weight of iron powder per 10 parts of potassium. The iron powder had a surface area of 0.55 m.²/gm.

Run No. 3 was carried out using sodium metal alone. In run No. 4, iron powder was used in combination with sodium. In run No. 5, iron oxide (Fe₂O₃) powder was added. This proved to be completely inactive as a promoter.

The results of these runs are set out in Table 1.

*Table 1*

| Run No. | 1 | 2 | 3 | 4 | 5 |
| --- | --- | --- | --- | --- | --- |
| Alkali Metal | K | K | Na | Na | Na |
| Percent mole, basis toluene | 10.0 | 8.9 | 10.0 | 9.2 | 9.2 |
| Percent wt., basis toluene | 4.4 | 3.9 | 2.5 | 2.3 | 2.3 |
| Added Material | | Fe | | Fe | Fe₂O₃ |
| Percent wt., basis toluene | | 2.8 | | 2.8 | 2.8 |
| Toluene: | | | | | |
| grams | 92.0 | 92.0 | 92.0 | 92.0 | 92.0 |
| moles | 1.0 | 1.0 | 1.0 | 1.0 | 1.0 |
| Ethylene: | | | | | |
| grams | 28.0 | 29.0 | 28.0 | 29.0 | 30.0 |
| moles | 1.0 | 1.03 | 1.0 | 1.03 | 1.07 |
| Temperature, °C. | 200 | 200 | 200 | 200 | 200 |
| Reaction Time,ᵃ minutes | 120 | 30 | >240 | >240 | >240 |
| Maximum Pressure, atmospheres, gauge | 87 | 87 | 88 | 80 | 102 |
| Toluene Reacted, mole percent | 67.1 | 71.4 | 0.4 | 51.1 | 0.4 |
| Ethylene Reacted, mole percent | 100.0 | 98.3 | 8.0 | 77.4 | 8.0 |
| Ethylene Converted to Alkylate, mole percent | 93.0 | 92.2 | 0.5 | 67.5 | 0.0 |
| Yield, mole percent (basis ethylene): | | | | | |
| n-Propylbenzene | 37.0 | 43.9 | 0.5 | 29.2 | 0 |
| 3-Phenylpentane | 28.0 | 24.2 | trace | 19.1 | 0 |

ᵃ From 200° C. until pressure dropped to 20 atmospheres.

In each case, the iron powder-containing catalyst was substantially more active.

In comparing runs Nos. 1 and 2, both of which employed potassium as the alkali metal, the promoter caused the reaction time to be reduced from 120 to 30 minutes and the yield of primary reaction product, n-propylbenzene, to be increased from 37 to 44%.

In runs Nos. 3–5 the alkali metal was sodium. Under unpromoted conditions this was practically inactive, only 0.5% of the ethylene feed being converted to alkylate in run No. 3. With iron powder, in run No. 4, ethylene conversion to alkylate was 67.5%. Addition of iron oxide, in run No. 5, ssemed to suppress even the trace of reaction obtained in run No. 3.

EXAMPLE II

When runs Nos. 1 and 2 of Example I are repeated with lithium as the alkali metal, the amount of ethylene converted to alkylate is zero in the absence of iron promoter but a substantial conversion of ethylene to alkylate is obtained when the catalyst contains powdered iron.

EXAMPLE III

When runs Nos. 1 and 2 of Example I are repeated with cesium as the alkali metal, substantial conversion of ethylene is obtained in each case, but the reaction time is shortened and selectivity to n-propylbenzene increased by use of iron powder.

EXAMPLE IV

Run No. 6 was carried out in essentially the same manner as run No. 3 of Example I but the olefin employed was propylene. The reaction conditions and results are shown in Table 2.

*Table 2*

| Run No. | 6 |
| --- | --- |
| Alkali Metal | K |
| Percent mole, basis toluene | |
| Percent wt., basis toluene | 4.2 |
| Iron Powder: | |
| Percent wt., basis toluene | 3.0 |
| Toluene: | |
| grams | 92.0 |
| moles | 1.0 |
| Propylene: | |
| grams | 45.0 |
| moles | 1.07 |
| Temperature, °C. | 200–225 |
| Reaction Time,ᵃ minutes | 240 |
| Maximum Pressure, atmospheres, gauge | 47.5 |
| Toluene Reacted, mole percent | 56.8 |
| Propylene Reacted, mole percent | |
| Propylene Converted to Alkylate, mole percent | 47.9 |
| Yield, mole percent (basis propylene): | |
| Isobutylbenzene | 43.8 |
| n-Butylbenzene | 4.1 |

ᵃ From 200° C. until pressure dropped to 20 atmospheres.

Satisfactory conversion and selectivity to isobutylbenzene were obtained in this run. Unpromoted potassium gives a much poorer conversion and selectivity. Even the use of anthracene-promoted potassium in a similar alkylation, that of cumene with propylene, resulted in a yield of only 4.4% of mono- adduct, compared with a yield of 34% when ethylene was used at about the same conditions with anthracene-promoted potassium.

EXAMPLE V

When 1-methyl-1-cyclohexene is substituted for toluene in Example IV, a substantial conversion to 1-isobutyl-1-cyclohexene is obtained.

EXAMPLE VI

One gram mole of aniline is reacted with one gram mole of ethylene in a manner similar to the toluene in Example I. The catalyst is 4 grams of potassium containing 3 grams of iron powder. The reaction mixture is maintained at 200° C. for 6 hours. After separation of the products, the principal product is found to be N-ethylaniline.

EXAMPLE VII

In a run in which 82 parts of cyclohexene and 8 parts of sodium are heated for 17 hours at 900–1000 atmospheres pressure of ethylene at 225° C., ethylene being added to maintain the pressure, the reaction product contains about 19 parts of ethylcyclohexenes.

When the same reactants are contacted in the presence of 8 parts of sodium containing 8 parts of finely-powdered iron, the same reaction takes place more readily at a substantially lower pressure.

EXAMPLE VIII

An experiment was carried out in which propylene was the sole hydrocarbon reactant. One gram mole of benzene was placed in an autoclave to provide a liquid phase, and 1.52 moles of propylene were then gradually added in the same manner as ethylene had been added in run No. 1. The catalyst consisted of 3.9 grams of potassium and 2.8 grams of iron powder. The reaction was carried out at 200° C. over a period of 4 hours. The maximum pressure was 139 atmospheres and the final pressure 51 atmospheres. 65% of the propylene charged was converted. Of the converted portion, 19% was converted to propane and 47% to $C_6$ olefins. The $C_6$ olefin fraction contained 58% 4-methyl-1-pentene.

In a comparison experiment, propylene was converted by use of an anthracene-promoted sodium catalyst at otherwise identical conditions. Only 20 mole percent of the propylene was converted, and the dimer fraction consisted of the following: 45% 4-methyl-2-pentene; 32% 2-methyl-2-pentene; 16% 4-methyl-1-pentene and 7% 2-methyl-1-pentene.

By comparing these data, it is seen that the catalyst of this invention is not only substantially more active in promoting the dimerization of propylene, but it effects an entirely different product distribution in that 4-methyl-1-pentene, which was present only in a small amount in the product made with a conventional catalyst is now the major product of the reaction.

EXAMPLE IX

In an experiment carried out in a manner similar to Example VIII, a mixture of 0.6 mole ethylene and 0.5 mole propylene was charged to an autoclave containing 78 grams benzene solvent and 4.0 grams potassium, promoted with 3.1 grams iron powder. The temperature varied between 150° and 172° C. The maximum pressure was 51 atmospheres. The time was only 22 minutes. 88.8 mole percent of the ethylene and 94.2 mole percent of the propylene were converted; the mole ratio of ethylene to propylene converted was 1.14. On a basis of 100 moles propylene reacted, the product contained 12.7 moles ethane, 1.8 moles propane, 23.2 moles pentene-1, 27.9 moles pentene-2 and 1.4 moles n-pentane. Of the $C_5$ product, 45.4% was pentene-1.

EXAMPLE X

One gram mole of toluene and one gram mole of benzalacetophenone

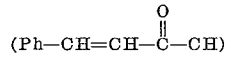

are employed as reactants in the presence of 10 mole percent of potassium, basis toluene, plus a weight of iron powder equal to the amount of potassium. The reaction mixture is maintained at 100°–200° C. for 2 hours. The principal reaction product is

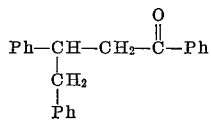

We claim as our invention:

1. A process for producing a dimeric condensation product in which an organic molecule containing an active hydrogen atom of the group consisting of mono-olefins and alkylated aromatic hydrocarbons combines with an alkene, which comprises contacting a reactant mixture containing both types of molecules at a temperature from about 100° C. to 350° C. and a pressure of from 5 to 100 atmospheres with a catalytic amount of an alkali metal promoted by the addition of particles of finely-divided iron.

2. A process according to claim 1 in which the weight ratio of finely-divided iron to alkali metal is in the range from 1:100 to 100:1.

3. A process according to claim 1 wherein the first named compound is an alkylated aromatic hydrocarbon.

4. A process according to claim 1 wherein said first-named compound is an acyclic mono-olefin having more than two carbon atoms per molecule and at least one allylic hydrogen and said second-named compound is an acyclic mono-olefin.

5. A process according to claim 4 wherein the first- and second-named compounds are two molecules of a single mono-olefin.

6. A process according to claim 5 wherein the olefin is propylene.

7. A process according to claim 1 wherein said first-named compound is an alkyl-aromatic hydrocarbon and said second compound is ethylene.

8. A process according to claim 1 wherein said alkali metal is sodium.

9. A process according to claim 1 wherein said alkali metal is potassium.

10. A process for producing n-propylbenzene and 3-phenylpentane which comprises condensing ethylene and toluene at a condensation temperature of from about 100° to about 350° C. and at a condensation pressure of from about 5 to about 100 atmospheres in the presence of a catalytic amount of an alkali metal promoted by the addition of particles of finely-divided iron.

11. A process for the production of 4-methyl-1-pentene which comprises condensing propylene in the presence of an inert organic solvent at a temperature of from about 100° to about 350° C. and at a pressure of from about 5 to about 100 atmospheres in the presence of a catalytic amount of an alkali metal promoted by the addition of particles of finely-divided iron.

(References on following page)

References Cited in the file of this patent

UNITED STATES PATENTS

| | | |
|---|---|---|
| 2,466,694 | Freed | Apr. 12, 1949 |
| 2,577,289 | Tiganik | Dec. 4, 1951 |
| 2,688,044 | Pines et al. | Aug. 31, 1954 |
| 2,721,885 | Pines et al. | Oct. 25, 1955 |
| 2,721,886 | Pines et al. | Oct. 25, 1955 |
| 2,797,200 | Barber et al. | June 25, 1957 |
| 2,881,234 | Esmay et al. | Apr. 7, 1959 |

FOREIGN PATENTS

| | | |
|---|---|---|
| 294,817 | Germany | June 29, 1917 |
| 22,897/56 | Australia | Nov. 3, 1956 |

OTHER REFERENCES

Storch et al.: "The Fischer-Tropsch and Related Syntheses," John Wiley & Sons, Inc., New York, page 567 (1951).